(12) United States Patent
Singleton et al.

(10) Patent No.: US 10,359,825 B2
(45) Date of Patent: Jul. 23, 2019

(54) DYNAMIC POWER MEASUREMENT USING FORMAL

(71) Applicant: Imagination Technologies Limited, Kings Langley (GB)

(72) Inventors: Iain Singleton, Hemel Hempstead (GB); John Alexander Osborne Netterville, Kings Langley (GB); Ashish Darbari, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 191 days.

(21) Appl. No.: 15/351,644

(22) Filed: Nov. 15, 2016

(65) Prior Publication Data
US 2017/0205864 A1   Jul. 20, 2017

(30) Foreign Application Priority Data

Jan. 18, 2016   (GB) .................................. 1600923.5

(51) Int. Cl.
| | |
|---|---|
| *G06F 17/50* | (2006.01) |
| *G06F 1/28* | (2006.01) |
| *G06F 1/3234* | (2019.01) |
| *G06F 1/12* | (2006.01) |

(52) U.S. Cl.
CPC ................. *G06F 1/28* (2013.01); *G06F 1/12* (2013.01); *G06F 1/3243* (2013.01); *G06F 17/504* (2013.01); *G06F 17/5045* (2013.01); *G06F 2217/78* (2013.01); *Y02D 10/152* (2018.01)

(58) Field of Classification Search
CPC . G06F 1/12; G06F 1/28; G06F 17/504; G06F 17/5045; G06F 1/3243; G06F 2217/78; G01R 31/31704; Y02D 10/152
See application file for complete search history.

(56) References Cited

U.S. PATENT DOCUMENTS

| | | | |
|---|---|---|---|
| 2009/0006012 A1 | 1/2009 | Kawabe | |
| 2009/0157375 A1* | 6/2009 | Yamamoto | G06F 17/5036 703/14 |
| 2010/0095256 A1 | 4/2010 | Kavalpati et al. | |
| 2012/0095737 A1 | 4/2012 | Sasaki et al. | |
| 2013/0191054 A1 | 7/2013 | Cho et al. | |
| 2015/0234959 A1* | 8/2015 | Gangadharan | G06F 17/5031 716/108 |
| 2015/0278416 A1 | 10/2015 | Darbari | |

FOREIGN PATENT DOCUMENTS

| | | |
|---|---|---|
| GB | 2519181 A | 4/2015 |
| JP | 2002288257 A | 10/2002 |

\* cited by examiner

*Primary Examiner* — Vuthe Siek
(74) *Attorney, Agent, or Firm* — Vorrys, Sater, Seymour and Pease LLP; Vincent M DeLuca

(57) ABSTRACT

Methods, systems and hardware monitors for verifying that an integrated circuit defined by a hardware design meets a power requirement including detecting whether a power consuming transition has occurred for one or more flip-flops of an instantiation of the hardware design; in response to detecting that a power consuming transition has occurred, updating a count of power consuming transitions for the instantiation of the hardware design; and determining, whether the power requirement is met at a particular point in time by evaluating one or more properties that are based on the count of power consuming transitions.

16 Claims, 13 Drawing Sheets

| Clock Edge | D | Q | Type of Power Consumed |
|---|---|---|---|
| Changes | Stable | Stable | CP, LP |
| Changes | Changes | Changes | CP, LP, TP, DP |
| Stable | Changes | Stable | LP, DP |
| Stable | Stable | Stable | LP |

DYNAMIC POWER MEASUREMENT USING FORMAL

BACKGROUND

The power efficiency of integrated circuits, such as system-on-chips (SoCs), is a key factor in assessing the quality of integrated circuits. Accordingly a significant amount of time is spent analyzing and adjusting hardware designs for integrated circuits to optimize power consumption.

The embodiments described below are provided by way of example only and are not limiting of implementations which solve any or all of the disadvantages of known power analysis systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods, systems and hardware monitors for verifying that an integrated circuit defined by a hardware design meets a power requirement. The method includes detecting whether a power consuming transition has occurred for one or more flip-flops of an instantiation of the hardware design; in response to detecting that a power consuming transition has occurred, updating a count of power consuming transitions for the hardware design; and determining, whether the power requirement is met at a particular point in time by evaluating one or more properties that are based on the count of power consuming transitions.

In some examples the power requirement may be that the number of power consuming transitions (or the related power consumption) is less than a predetermined value under certain conditions or a certain scenario. In these examples a property may compare the count of power consuming transitions to the predetermined value. In other examples the power requirement may be that the number of power consuming transitions (or the related power consumption) is less than the number of power consuming transitions (or the related power consumption) of another hardware design (e.g. a previous iteration of the same hardware design) under the same conditions or the same scenario. In these examples a property may compare the count of power consuming transitions to the count of power consuming transitions for the other hardware design.

A first aspect provides a hardware monitor for use by a formal verification tool to verify that an integrated circuit defined by a hardware design meets a power requirement, the hardware monitor comprising: one or more transition detection logic units, the one or more transition detection logic units configured to detect whether a power consuming transition has occurred with one or more flip-flops of an instantiation of the hardware design; one or more counter update logic units in communication with the one or more transition detection logic units, the one or more counter update logic units configured to count a number of power consuming transitions detected by the one or more transition detection logic units; and a property verification logic unit configured to determine whether the power requirement is met at a particular point in time by evaluating one or more properties based on the number of power consuming transitions counted by the one or more counter update logic units.

A second aspect provides a system configured to verify that an integrated circuit defined by a hardware design meets a power requirement, the system comprising: the hardware monitor of the first aspect; a scenario defined in a formal verification language; and a formal verification tool configured to formally verify whether the integrated circuit defined by the hardware design meets the power requirement for the scenario using the hardware monitor.

A third aspect provides a method of verifying that an integrated circuit defined by a hardware design meets a power requirement, the method comprising: detecting, using a hardware monitor, whether a power consuming transition has occurred for one or more flip-flops of an instantiation of the hardware design; in response to detecting that a power consuming transition has occurred, updating, using the hardware monitor, a count of power consuming transitions for the instantiation of the hardware design; and determining, whether the power requirement is met at a particular point in time by evaluating one or more properties based on the count of power consuming transitions for the instantiation of the hardware design.

A fourth aspect provides computer readable code adapted to perform the steps of the method of the third aspect when the code is run on a computer.

A fifth aspect provides a computer readable storage medium having encoded thereon the computer readable code of the fourth aspect.

A sixth aspect provides a method of manufacturing, at an integrated circuit manufacturing system, a hardware monitor of the first aspect.

A seventh aspect provides an integrated circuit definition dataset that, when processed in an integrated circuit manufacturing system, configures the system to manufacture a hardware monitor of the first aspect.

An eighth aspect provides a computer readable storage medium having stored thereon an integrated circuit definition dataset that, when processed in an integrated circuit manufacturing system, configures the system to manufacture a hardware monitor of the first aspect.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
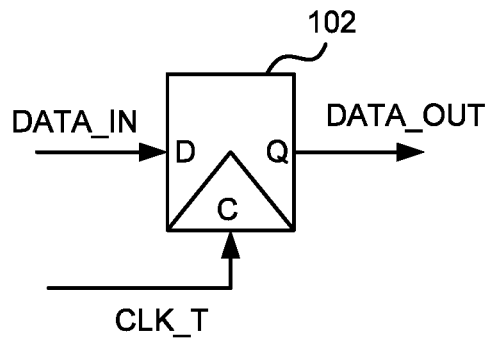
FIG. 1 is a schematic diagram of an example D-type flip-flop.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein are methods and systems for verifying that an integrated circuit defined by a hardware design meets a power requirement. The power requirement may be, for example, that the integrated circuit defined by the hardware design consumes less power than an integrated circuit defined by another hardware design (e.g. a previous iteration of the same hardware design); or that the power consumption of the integrated circuit defined by the hardware design remains within predefined bounds. Some of the methods and systems described herein estimate the dynamic power consumption of the integrated circuit defined by the hardware design from the number of power consuming transitions and determine whether the power requirement is met based on the estimated dynamic power consumption (i.e. the number of power consuming transitions) using formal.

The term "hardware design" is used herein to refer to a description of an integrated circuit for all or part of an electronic system (e.g. a processor) which can be used to generate a hardware manifestation of the integrated circuit (e.g. the hardware design may be synthesized into silicon or used to program a field-programmable gate array (FPGA)). The hardware design may relate to a module, block, unit, sub-system, system or any combination thereof of the electronic system (e.g. processor).

A hardware design may be implemented in a high level hardware description language (HDL), such as, but not limited to, a register transfer language (RTL). Examples of register transfer languages include, but are not limited to, VHDL (VHSIC Hardware Description Language) and Verilog. It will be evident to a person of skill in the art that other high level hardware description languages may be used such as proprietary high level hardware description languages.

An "instantiation of the hardware design" refers to a representation of the hardware defined by the hardware design. An instantiation of the hardware design embodies the hardware design in a form which can be tested to verify the hardware design. An instantiation of a hardware design includes, but is not limited to, a synthesized version of the hardware design, a hardware implementation of the hardware design (e.g. an integrated circuit made according to the hardware design), and a mathematical model (e.g. a state-transition system) generated by a formal verification tool.

As described above, minimizing the power consumption of an integrated circuit defined by a hardware design is an ongoing challenge. Reducing the power consumption of the integrated circuit typically involves analyzing the power consumption of the integrated circuit described by the hardware design and modifying the hardware design based on the analysis to reduce the power consumption of the integrated circuit. There are many software tools that can aid in power analysis and measurement. However, once a hardware design has been modified, it is important to be able to determine exhaustively whether the integrated circuit defined thereby actually consumes less power than the integrated circuit described by the previous iteration of the hardware design and/or whether the power consumption of the integrated circuit defined by the modified hardware design remains within expected bounds.

There are two main components to the power consumed by an integrated circuit: static power and dynamic power. Static power is the power that is consumed when the integrated circuit is in a steady state (i.e. the integrated circuit is not switching or changing state). In other words the static power is the power that is consumed regardless of whether there is a state change. Static power typically comprises the standby or leakage power and may vary for different states of the clock(s), data and output. In contrast, dynamic power is the power that is consumed to invoke a state transition (i.e. power that is consumed when the integrated circuit is switching or changing state). Dynamic power is consumed when a transistor switches from one logic state to another. An integrated circuit is typically comprised of flip-flops and gates which each comprise one or more transistors. For example, a reset D-type flip-flop may have around twelve transistors and a two-input AND gate may have six transistors. The remainder of this application will be focused on estimating the dynamic power associated with flip-flop transitions, but similar principles could be applied to estimate the dynamic power of individual gates as well.

Dynamic power associated with a flip-flop comprises three sub-components: transition power, clock power, and data power. Transition power (also referred to as switching power) is the power that is consumed by a flip-flop when there is an output transition (e.g. the output of the flip-flop transitions from a "0" to a "1"). Clock power is the power that is consumed by a flip-flop when a transition on the clock trigger signal takes place (e.g. the clock input transitions from a "0" to a "1"). Data power is the power consumed by a flip-flop when there is an input transition (e.g. the input to the flip-flop transitions from a "0" to a "1"). The specific dynamic power consumed by a flip-flop is based on the switching (frequency), voltage and capacitance.

Reference is made to FIG. 1 which illustrates an example D-type flip-flop 102 which has a data input port (D) which receives an input data signal (DATA_IN), a clock input port (C) which receives a clock trigger signal (CLK_T), and an output port (Q) which outputs a data signal (DATA_OUT). The clock trigger signal (CLK_T) controls or triggers when the data at the input port (D) is latched or stored in the flip-flop, and when the data stored in the flip-flop is output. For example, in some cases when the clock trigger signal (CLK_T) is HIGH the value presently stored in the flip-flop will be output as DATA_OUT and the present value of the DATA_IN signal will be stored in the flip-flop.

The clock trigger signal (CLK_T) may be a clock signal, or it may be a clock signal combined with one or more other signals, such as an enable signal and/or a clock gating signal. The enable signal may be, for example, the output of a latch controlled from a power domain setting which may be controlled by software. Where the clock trigger signal (CLK_T) is a clock signal the D-type flip-flop implements a one cycle delay to the input data signal (DATA_IN). Specifically, the value of DATA_IN will be seen on DATA_OUT one cycle later (e.g. the next clock cycle).

FIG. 1 illustrates a table 104 showing the type of power that is consumed for different states of the flip-flop 102. It can be seen from the table 104 that regardless of the state of any of the signals or a transition thereof leakage power (LP) is consumed. If there is a transition on the DATA_IN signal then data power (DP) is consumed; if there is a transition on the clock trigger signal (e.g. CLK_T) then clock power (CP) is consumed; and if there is a transition on the DATA_OUT signal then transition power (TP) is consumed.

Typically the static power (e.g. leakage power (LP)) is minor and thus the power consumption of an integrated circuit can be accurately estimated from the dynamic power consumption. Accordingly, the power consumption of an integrated circuit may be estimated by counting one or more of the number of flip-flop transitions, clock trigger signal transitions, and/or input data signal transitions which will collectively be referred to herein as power consuming transitions.

Described herein are systems, methods, and hardware monitors for verifying that an integrated circuit defined by a hardware design meets a power requirement for a scenario by generating one or more properties that define the power requirement in terms of the number of power consuming transitions; counting one or more types of power consuming transitions for the scenario; and verifying the properties.

For example, the power requirement may be that the number of power consuming transitions for a particular flip-flop containing read data from a memory access does not exceed 100 for a particular scenario—e.g. any 50 reads that can occur in any order and in any combination. A property is generated which states that the counted number of power consuming transitions for the read flip-flop is less than 100. A hardware monitor is generated and configured to count the number of power consuming transitions for the particular read flip-flop. The hardware design, the hardware monitor, the property, and the scenario are loaded into a formal verification tool. The formal verification tool then determines whether there is a combination of 50 reads which results in more than 100 power consuming transitions. In other words, the formal verification tool determines whether there exists a combination of up to 50 reads which causes the property to fail (i.e. for there to be more than 100 power consuming transitions).

Figure 2:
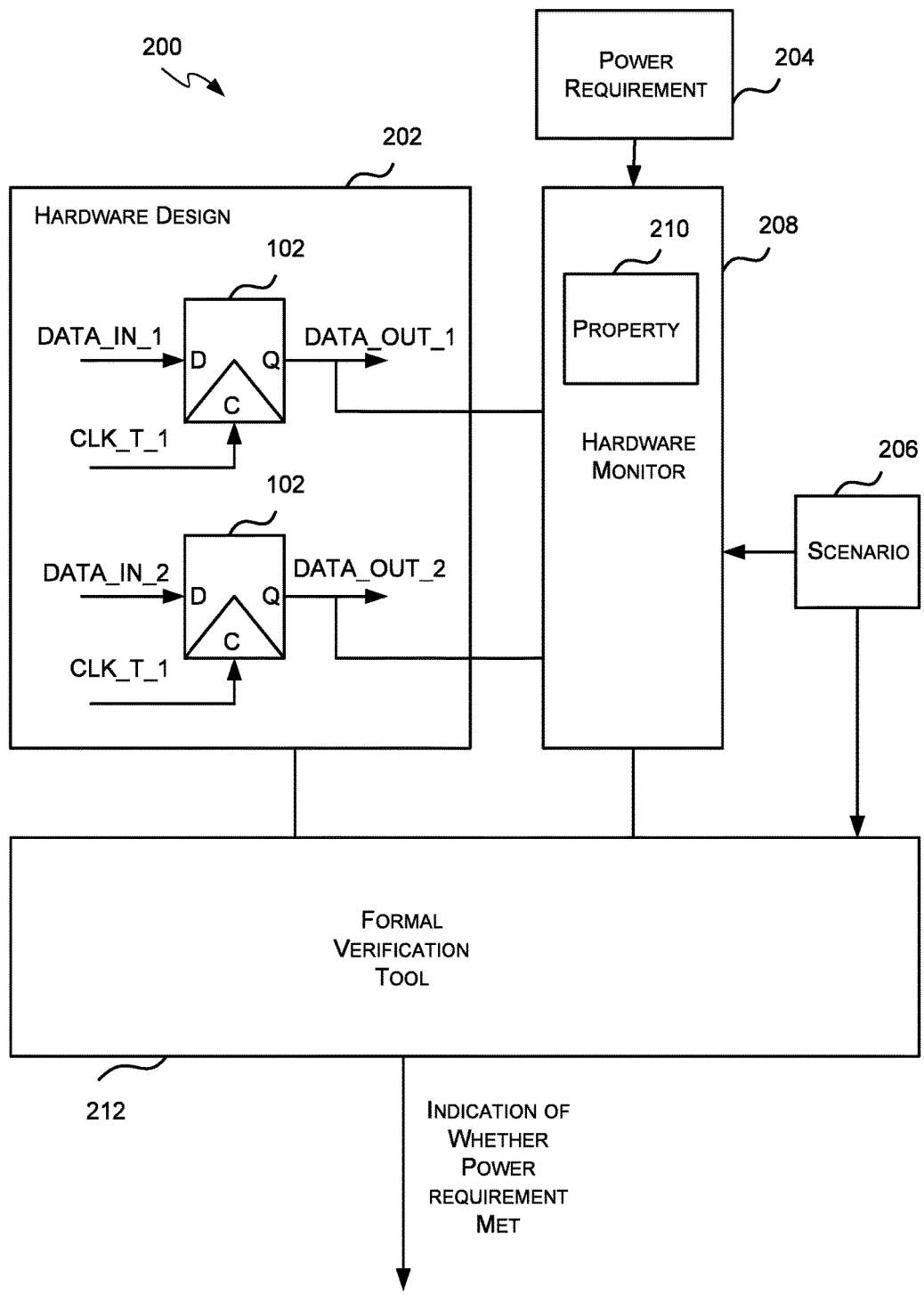
FIG. 2 is a block diagram of an example system for verifying that an integrated circuit defined by a hardware design meets a power requirement for a defined scenario.

Reference is now made to FIG. 2 which illustrates an example system 200 for exhaustively verifying that an integrated circuit defined by a hardware design meets a power requirement. The system 200 comprises a hardware design 202 for an integrated circuit that comprises or defines one or more flip-flops 102; a power requirement 204; a scenario 206 under which the power requirement 204 is to be met; a hardware monitor 208 for counting one or more types of power consuming transitions; one or more properties 210 which are used to determine whether the power requirement is met based on the count(s); and a formal verification tool 212 configured to use the hardware monitor 208 and properties 210 to determine if the integrated circuit described by the hardware design 202 meets the power requirement 204 for the defined scenario 206.

The hardware design 202 describes or defines an integrated circuit with one or more flip-flops 102. The exemplary hardware design 202 of FIG. 2 comprises two D-type flip-flops 102 as described above with respect to FIG. 1, but it will be evident to a person of skill in the art that the methods and principles described herein can be equally applied to hardware designs describing integrated circuits with more or fewer flip-flops and/or different types of flip-flops. As described above, the hardware design 202 may define an integrated circuit for all or part of an electronic device (e.g. processor) and may be implemented in a hardware description language (HDL), such as but not limited to, a register transfer level (RTL) language.

The power requirement 204 defines the power consumption criteria that the integrated circuit defined by the hardware design 202 is expected to meet. In some cases, the power requirement 204 may specify that the dynamic power consumption is less than a predetermined threshold or maximum value. The predetermined threshold or maximum value may be expressed in terms of a number of power consuming transitions (or a specific type of power consuming transitions) or in terms of power. For example, the power requirement 204 may specify that the total number of power consuming transitions is less than a predetermined number (e.g. the total number of power consuming transitions is less than 100) or that the total dynamic power consumption is less than a certain power value (e.g. the total dynamic power consumption is less than 10 nW).

In other cases the power requirement 204 may specify that the dynamic power consumption of the integrated circuit defined by the hardware design 202 is less than the dynamic power consumption of the integrated circuit defined by another hardware design (e.g. a previous version of the hardware design 202). For example the power requirement 204 may specify that the number of power consuming transitions (or a specific type of power consuming transitions) for an instantiation of a particular hardware design is less than the counted number of power consuming transitions (or a specific type of power consuming transitions) for an instantiation of another hardware design under the same conditions or scenario 206.

The scenario 206 defines (e.g. in a formal verification language) the circumstances under which the power requirement 204 is to be met. For example, the scenario 206 may define that the power requirement 204 is to be met for 50 reads of a particular read flip-flop done in any order and any combination.

The scenario 206 may define which flip-flops are to be monitored and the type of power consuming transitions to be counted for those flip-flops. In some cases the scenario 206 may directly identify which flip-flop(s) 102 are relevant. For example, the scenario 206 may identify a particular flip-flop, multiple selected flip-flops, or all the flip-flops. In other cases the scenario 206 may more generally specify a component and or aspect of an instantiation of the hardware design 202 which is used to identify the relevant flip-flops For example, the scenario 206 may specify that the read components are relevant and this may be used to identify the flip-flops that are considered read components.

The hardware monitor 208 is a module configured to monitor the inputs and/or outputs of one or more flip-flops of an instantiation of the hardware design 202 to count one or more types of power consuming transitions. The hardware monitor 208 may be implemented in software. For example, the hardware monitor 208 may be implemented using a hardware description language (HDL).

As described above, there are three types of power consuming transitions—flip-flop transitions (i.e. changes in the output signal of a flip-flop (e.g. DATA_OUT); clock signal transitions (i.e. changes in the clock trigger signal of a flip-flop (e.g. CLK_T)); and data transitions (i.e. transitions in the input data signal (e.g. DATA_IN)). The hardware monitor 208 may be configured to count one, or more than one, type of power consuming transitions based on the power requirement 204 and scenario 206.

In some examples, as shown in FIG. 2, the hardware monitor 208 may be configured to count the number of flip-flop transitions (i.e. the changes in output of the flip-flop(s)). In these examples the hardware monitor 208 is configured to monitor the output signal (e.g. "Q" output) of the one or more flip-flops 102. In other examples, the hardware monitor 208 may be configured to count the number of clock trigger signal transitions (i.e. the changes in the clock trigger signal). In these examples the hardware monitor 208 is configured to monitor the clock trigger signal (e.g. "C" input) to the one or more flip-flops. In yet other examples, the hardware monitor 208 may be configured to count both the flip-flop transitions and the clock trigger signal transitions. In these examples the hardware monitor 208 is configured to monitor both the output signal (e.g. "Q" output) and the clock trigger signal (e.g. "C" input) to one or more flip-flops 102.

The hardware monitor 208 may be configured to count power consuming transitions for one or more of the flip-flops in an instantiation of the integrated circuit defined by the hardware design 202 depending on, for example, the scenario 206.

The hardware monitor 208 is bound to the corresponding signals of the hardware design 202. For example, where, as shown in FIG. 2, the hardware monitor 208 is configured to monitor the flip-flop transitions of two flip-flops 102 of an instantiation of the hardware design 202 then the hardware monitor 208 is bound to the outputs (e.g. DATA_OUT_1 and DATA_OUT_2) of the flip-flops. Where the hardware monitor 208 is implemented in SV and the hardware design 202 is implemented in RTL, the SV code is bound to the RTL code.

The properties 210 express the power requirement in terms of the number of power consuming transitions. A determination of whether the power requirement is met can then be determined by evaluating the properties 210 to determine whether they are true based on the number of power consuming transitions counted by the hardware monitor 208.

As is known to those of skill in the art a property is a statement or expression that captures design behavior. For example, a simple property may be a=b. Within HDL designs, a property is an executable statement that checks for specific behavior within the HDL design. For example if a design contains a FIFO (first in first out) buffer a property may be that neither overflow nor underflow of the FIFO may occur.

Properties are used to capture required or desired temporal behavior of an instantiation of the hardware design in a formal and unambiguous way. The design can then be verified to determine that an instantiation of the design conforms to the required or desired behavior as captured by one or more properties.

Since properties capture the design behavior on a cycle-by-cycle basis they can be used to verify intermediate behaviors. In the examples described herein the one or more properties express the power requirement as evaluable expressions or statements based on the count of the power consuming transitions.

If, for example, the power requirement is that there must not be more than 100 power consuming transitions, there may be a property that states that the count of power consuming transitions is less than or equal to 100. In this example, if the count is less than or equal to 100 then the property is valid or true and the power requirement is met; and if the count is greater than 100 then the property is invalid or false and the power requirement is not met.

In some cases the power requirement may be expressed in terms of actual power (e.g. Watts). In these cases the count of power consuming transitions may be converted to a power value (e.g. Watts) and the property is then defined to compare the converted power value (i.e. the power value the count represents) to the power value specified by the power requirement. For example, a table such as Table 1 shown below may be used to convert the count of power consuming transitions into power (e.g. Watts).

TABLE 1

| Flip-Flop | Vdd | Current | Power | Propagation Delay |
|---|---|---|---|---|
| SR | 1 V | 26.0 nA | 26.9 nW | 0.03 usec |
| D | 1 V | 41.30 nA | 41.30 nW | 0.02 usec |
| JK | 1 V | 6.51 uA | 6.45 uW | 0.04 usec |
| T | 1 V | 4.23 uA | 5.23 uW | 0.05 usec |

Properties are typically written in an assertion language. An assertion language, which also may be referred to as a property language captures the design behavior spread across multiple design cycles in a concise, unambiguous manner. While traditional hardware description languages (HDL), such as Verilog RTL, have the ability to capture individual cycle behavior, they are too detailed to describe properties at a higher level. In particular, assertion languages provide means to express temporal relationships and complex design behaviors in a concise manner. Assertion languages include, but are not limited to, System Verilog (SV), Property Specification Language (PSL), Incisive Assertion Library (IAL), Synopsys OVA (Open Vera Assertions), Symbolic Trajectory Evaluation (STE), Hardware Property Language (HPL), 0-In, and Open Verification Library (OVL).

Each property 210 may be asserted or covered. When a property is asserted it must always be true. In contrast, when a property is covered the property must be true at least once, but is not required to be true always.

The one or more properties 210 may form part of, or be integrated with, the hardware monitor 208 as shown in FIG. 2 or they may be bound to the hardware monitor 208.

Example implementations of the hardware monitor 208 and properties 210 are described below with reference to FIGS. 5, 7 and 9.

The hardware design 202 (e.g. RTL), hardware monitor 208 (e.g. SV), properties 210, bindings, and scenario 206 are loaded into a formal verification tool 212. The formal verification tool 212 is a software tool that is capable of performing formal verification of a hardware design. Formal verification is a systematic process that uses mathematical reasoning to verify a property in a hardware design. Formal verification can be contrasted to simulation-based verification in which a hardware design is tested by applying stimuli to an instantiation of the hardware design and monitoring the output of the instantiation of the hardware design in response to the stimuli.

In formal verification the hardware design (e.g. hardware design 202) is transformed into a mathematical model (e.g. a state-transition system) to thereby provide an instantiation of the hardware design which can be tested to verify the hardware design, and the properties (e.g. properties 210) are expressed using mathematical logic using a precise syntax or a language with a precise mathematical syntax and semantics.

A property is verified by searching the entire reachable state space of an instantiation of the hardware design (e.g. state transition system) without explicitly traversing the state machine. The search is done by, for example, encoding the states using efficient Boolean encodings using Binary decision diagrams (BDDS), or using advanced SAT (satisfiability-based bounded model checking) based techniques. In some cases tools can be used to implement techniques, such as, but not limited to, abstraction, symmetry, symbolic indexing, and invariants to improve performance and achieve scalability.

A property that is covered is verified by searching the reachable state space of an instantiation of the hardware design (e.g. state transition system) for at least one state in which the property is true. Once a state is found in which the property is true then the searching ceases. In contrast, a property that is asserted is verified by confirming the property is true for all states. In other words an asserted property is verified by searching the reachable state space of an instantiation of the hardware design for a state in which the property is not true. Since formal verification of an asserted property algorithmically and exhaustively explores all input values over time, verifying an asserted property in this manner allows a property to be exhaustively proved or disproved for all states.

The formal verification tool 212 may output an indication of whether or not the power requirement is met. The output may be yes the power requirement is met; no the power requirement is not met; or the formal verification was inconclusive. The formal verification may be inconclusive, for example, because the computing-based device running the formal verification tool 212 has run out of memory or because the formal verification tool 212 has determined that a certain amount of progress has not been made after a predefined period of time.

Accordingly, in the system 200 of FIG. 2 the formal verification tool 212 evaluates states of an instantiation of the hardware design 202 that fall within the defined scenario 206 using the hardware monitor 208 to determine whether the properties 210 are true (i.e. that each asserted property is true for all states and each covered property is true for at least one state).

Figure 3:
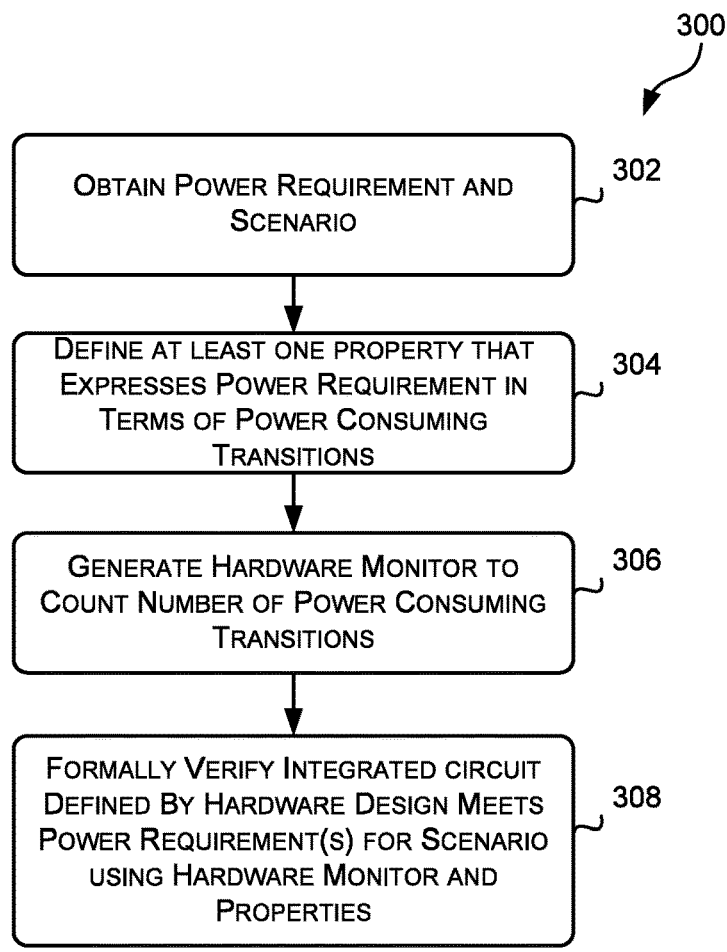
FIG. 3 is a flow diagram of an example method for verifying that an integrated circuit defined by a hardware design meets a power requirement for a defined scenario using the system of FIG. 2.

Reference is now made to FIG. 3 which illustrates a flow chart of a method 300 of verifying that the integrated circuit described by a hardware design meets a power requirement for a defined scenario. The method 300 begins at block 302 where the power requirement 204 to be satisfied; and the scenario 206 (e.g. defined in a formal verification language) under which the power requirement 204 is to be satisfied are obtained. Once the power requirement 204 and scenario 206 have been obtained the method 300 proceeds to block 304.

At block 304, one or more properties (e.g. properties 210) are defined which express the power requirement 204 in terms of the number of power consuming transitions. For example, if the power requirement is that the number of power consuming transitions should not exceed 100 then a property may be defined that states that the number of power consuming transitions is less than or equal to 100. Once the one or more properties are defined the method 300 proceeds to block 306.

At block 306, a hardware monitor (e.g. hardware monitor 208) is generated to count the number of power consuming transitions of relevant flip-flops based on the power requirement 204 and the scenario 206 obtained in block 302. As described above, the hardware monitor may be configured to count the number of flip-flop transitions and/or clock transitions for one or more relevant flip-flops of an instantiation of the hardware design. Once the hardware monitor is generated the method 300 proceeds to block 308.

At block 308, a formal verification tool (e.g. formal verification tool 212) uses the properties 210 defined in block 304, the hardware monitor obtained in block 306, and the scenario obtained in block 302 to formally verify that the integrated circuit defined by the hardware design meets the power requirement for the scenario. In particular, as described above, the formal verification tool assesses states of an instantiation of the hardware design, within the defined scenario 206, using the hardware monitor 208 to determine whether the properties 210 are true.

Figure 4:
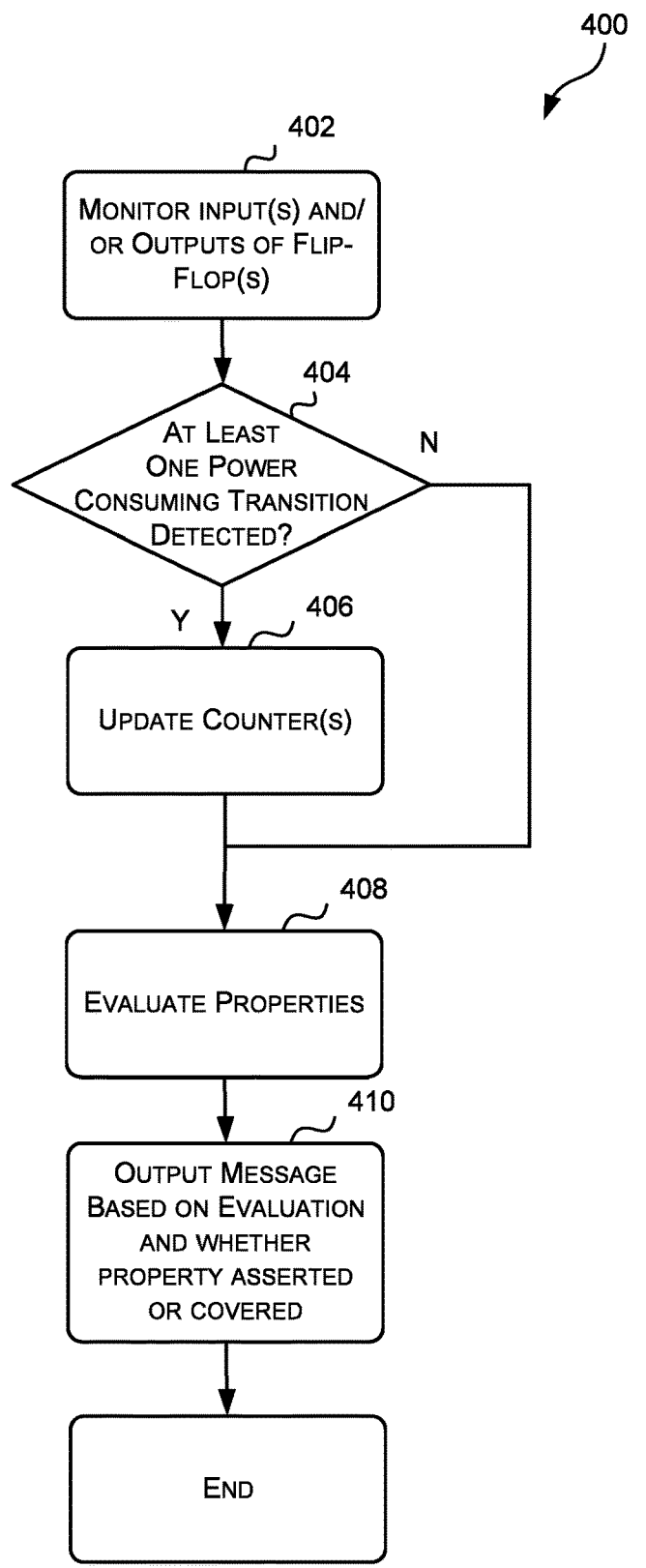
FIG. 4 is a flow diagram of an example method for determining whether an integrated circuit defined by a hardware design meets a power requirement using the hardware monitor of FIG. 2.
Figure 8:
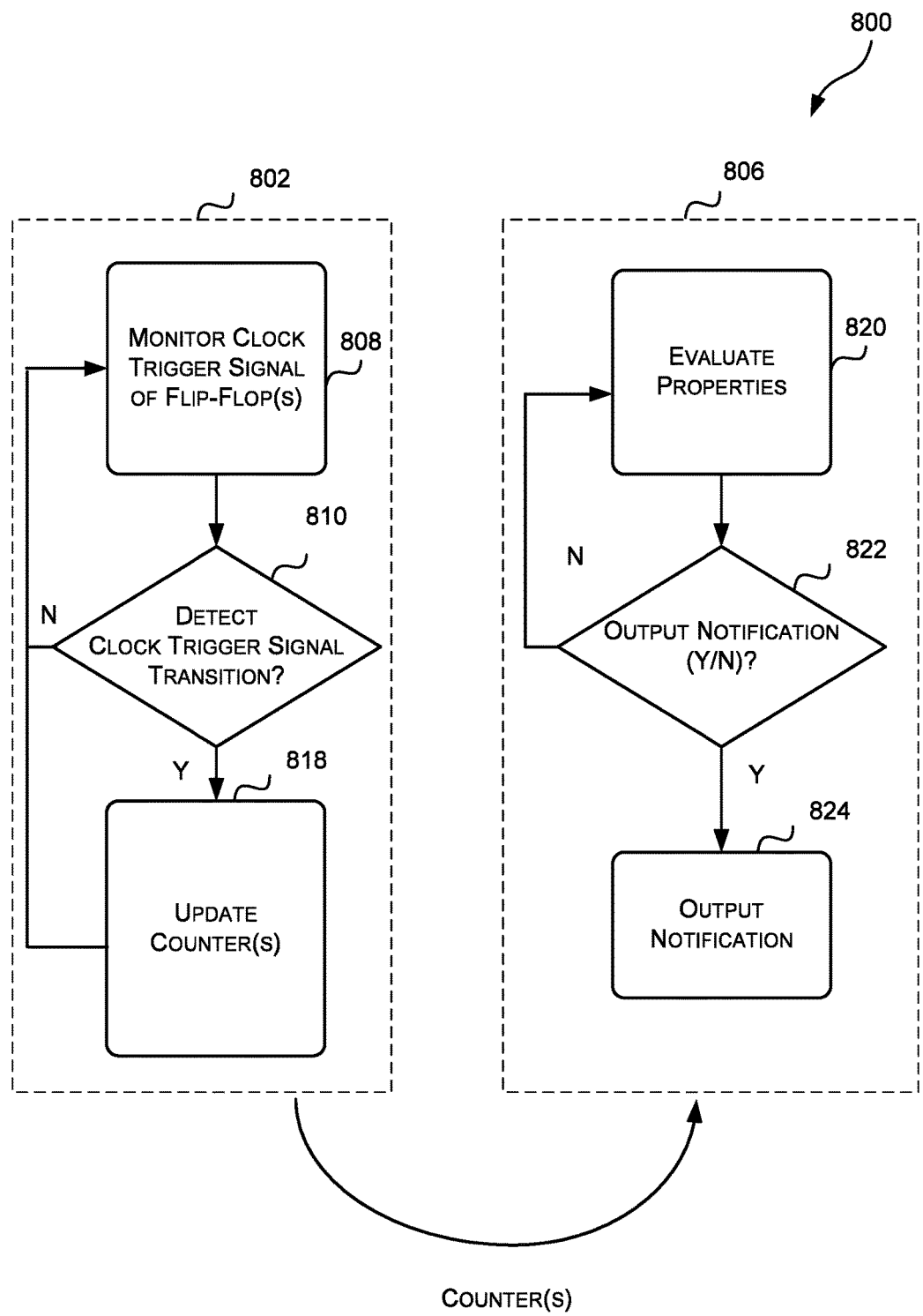
FIG. 8 is a flow diagram of an example method of determining whether an integrated circuit defined by a hardware design meets a power requirement using the hardware monitor of FIG. 7.

Reference is now made to FIG. 4 which illustrates an example method 400 for determining whether an integrated circuit defined by a hardware design meets a power requirement using the hardware monitor 208 of FIG. 8 wherein the properties 210 are integrated therein. In some cases the method 400 may be executed by the hardware monitor 208 each clock cycle (e.g. upon the rising edge of the clock signal). However, in other cases the method 400 may be executed more or less frequently, or upon a different trigger or triggers.

The method 400 begins at block 402 where the hardware monitor 208 of FIG. 2, monitors the inputs and/or output signals of one or more flip-flops of an instantiation of the hardware design based on the power requirement 204 and the scenario 206. As described above, the hardware monitor 208 may be configured, for example, to monitor: (i) the output signal (e.g. DATA_OUT) of one or more flip-flops to detect a flip-flop transition; (ii) the clock trigger signal (e.g. CLK_T) to detect an clock transition; or (iii) both the output signal (e.g. DATA_OUT) and the clock trigger signal (e.g. CLK_T) of one or more flip-flops to detect both flip-flop transitions and clock transitions. The input and/or output signals that are monitored may be referred to herein as the relevant signals. In some cases monitoring the relevant signals comprises sampling the relevant signals. The method 400 then proceeds to block 404.

At block 404 the hardware monitor 208 determines whether at least one power consuming transition has occurred. As described above, the hardware monitor 208 may determine that a power consuming transition has occurred if the current value of a monitored signal (e.g. the value of the signal in the current clock cycle) is different than the previous value of the monitored signal (e.g. the value of the signal in the previous clock cycle). If the hardware monitor 208 determines that no power consuming transitions have occurred then the method 400 may proceed to block 408. If, however, the hardware monitor 208 determines that at least one power consuming transition has occurred then the method 400 proceeds to block 406.

At block 406, the hardware monitor 208 updates one or more counters to reflect the number of power consuming transitions that have occurred. For example, if in block 404 it is detected that two power consuming transitions have occurred then the hardware monitor 208 may increment a counter value by two to reflect the fact that two additional power consuming transitions have occurred. Once the counter(s) have been updated the method 400 proceeds to block 408.

At block 408, the hardware monitor 208 evaluates one or more properties that express the power requirement in terms of the number of power consuming transitions to determine whether a power requirement is met. For example, where the power requirement is that the power consuming transitions must not exceed 100 then the property may state that the count of the power consuming transitions is less than or equal to 100. In this case evaluating the property may involve determining whether the count of power consuming transitions is less than or equal to 100. Once the properties have been evaluated the method 400 proceeds to block 410.

At block 410, a message may be output based on whether or not the properties were evaluated to be true and whether the properties were asserted or covered. For example, if an asserted property was determined not to be true in block 408 then a message may be output indicating that the assertion failed. If, however, a covered property was determined to be true in block 408 then a message may be output indicating that the cover has been met.

Example implementations of the hardware monitor 208 of FIG. 2 and operation thereof will be described below with reference to FIGS. 5 to 9.

Figure 5:
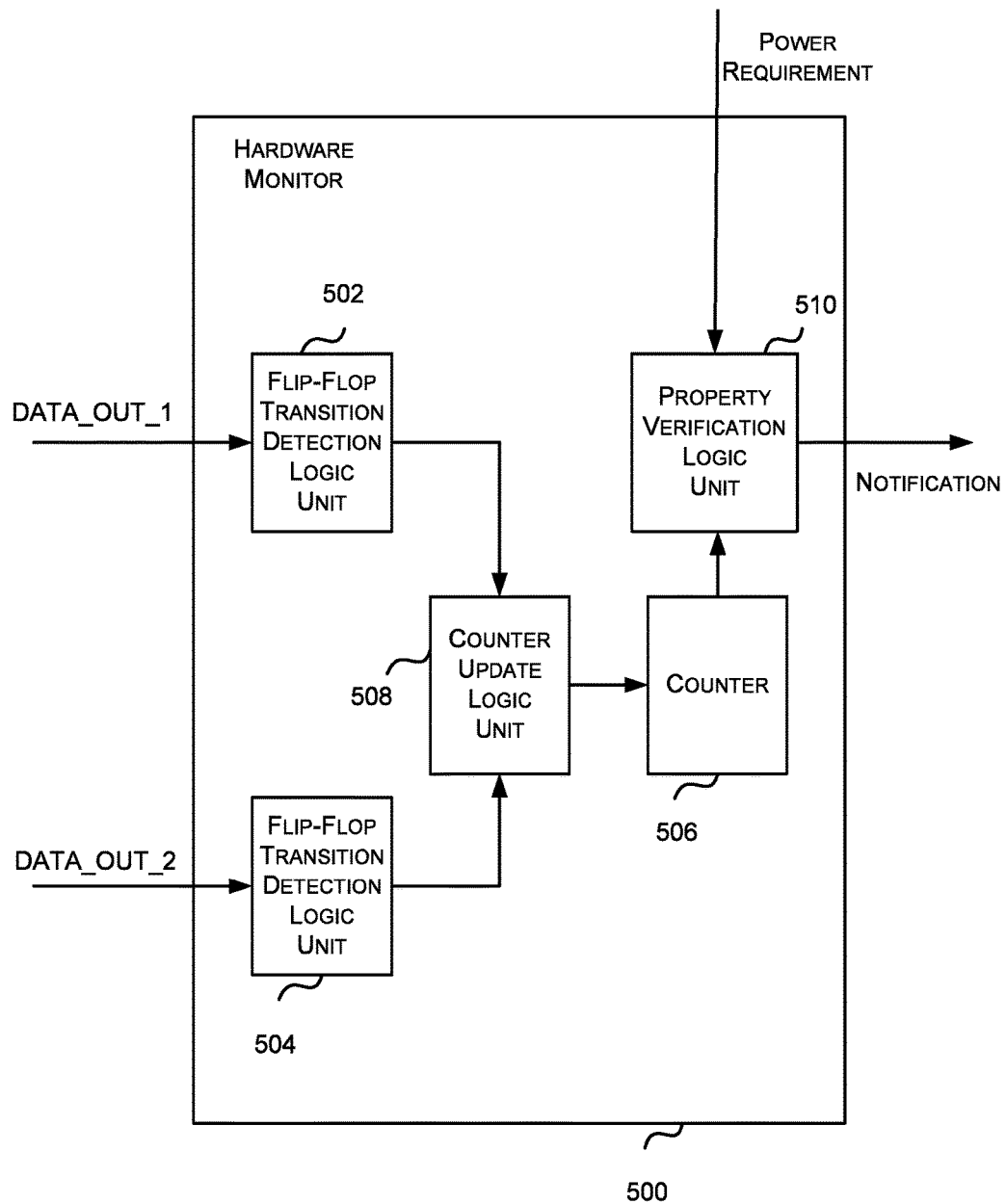
FIG. 5 is a block diagram of a first example implementation of the hardware monitor of FIG. 2.

Reference is now made to FIG. 5 which illustrates a first example implementation of a hardware monitor 500, which may be used as hardware monitor 208 of FIG. 2 in which the properties 210 are embedded therein. In this example implementation the hardware monitor 500 counts the number of output transitions of one or more flip-flops. In the example shown in FIG. 5, the hardware monitor 500 is configured to count the number of output transitions of two flip-flops in an instantiation of a hardware design. However, in other examples, the hardware monitor may be configured to count the flip-flop transitions for more or fewer flip-flops depending on, for example, the number of flip-flops in the instantiation of the hardware design and the power requirement 204 and/or scenario 206.

The hardware monitor 500 of FIG. 5 includes flip-flop transition detection logic units 502, 504 for detecting a flip-flop transition, a counter 506 for storing a count of the number of flip-flop transitions, a counter update logic unit 508 for updating the counter 506 after a flip-flop transition detection logic unit 502, 504 detects a flip-flop transition, and a property verification logic unit 510.

Each flip-flop transition detection logic unit 502, 504 monitors the output signal (e.g. DATA_OUT) of a particular flip-flop of an instantiation of the hardware design to determine when there is a change in the output signal of that flip-flop. In other words, each flip-flop transition detection logic unit 502, 504 is configured to detect when there has been a flip-flop transition for a particular flip-flop.

Each flip-flop transition detection logic unit 502, 504 may determine that there has been a change in the output of a particular flip-flop of an instantiation of the hardware design by sampling the output signal and comparing the sampled value of the output signal to the previous value of the output signal (e.g. comparing the value of the output signal in a current clock cycle to the value of the output signal in the previous clock cycle). If the current value is different than the previous value then a flip-flop transition has been detected. If, however, the current value of the output signal is the same as the previous value of the output signal then a flip-flop transition is not detected.

In some cases, the flip-flop transition detection logic unit 502, 504 may be configured to use a formal verification language system function to obtain the previous value of the output signal (e.g. DATA_OUT). For example, SVA has the system function $past (x) which returns the value of an expression, x, in a previous clock cycle. In other cases, the flip-flop transition detection logic unit 502, 504 may be configured to store the current value of the output signal (e.g. DATA_OUT) in a memory unit, such as a register, and then in the subsequent clock cycle the previous value of the output signal (e.g. DATA_OUT) can be obtained from the memory unit (e.g. register).

When a flip-flop transition detection logic unit 502 or 504 detects a flip-flop transition it notifies the counter update logic unit 508. For example, the flip-flop transition detection logic unit 502 or 504 may output an update signal that is received by the counter update logic unit 508.

Although the hardware monitor 500 of FIG. 5 has a separate flip-flop transition detection logic unit 502, 504 for each flip-flop that is being monitored, it will be evident to a person of skill in the art that there may be a single flip-flop transition detection logic unit that is configured to monitor multiple flip-flops for flip-flop transitions. In these cases the flip-flop transition detection logic unit may be configured to output the number of transitions detected in each clock cycle as part of the update signal; or the flip-flop transition detection logic unit may be configured to output multiple update signals (e.g. one per monitored flip-flop).

The counter 506 is used to store the count of the number of flip-flop transitions that have been detected. As described above, the number of flip-flop transitions represents the transition power consumption of the relevant component or part of the integrated circuit defined by the hardware design. The counter 506 may be implemented using any suitable memory module, such as a register. The counter 506 is updated by the counter update logic unit 508.

Although the hardware monitor 500 of FIG. 5 has a single counter 506 for storing a total count of the flip-flop transitions for all monitored flip-flops, in other cases there may be a counter for each monitored flip-flop that is used to store the count or number of flip-flop transitions for that particular flip-flop. In these cases there may be a single counter update logic unit that is configured to update all counters or there may be a counter update logic unit for each counter that is responsible for updating that counter.

The counter update logic unit 508 monitors the notifications (e.g. update signal(s)) received from the flip-flop transition detection logic units 502, 504 to determine if they indicate a flip flop transition has occurred. If the counter update logic unit 508 detects that at least one flip-flop transition has occurred then the counter update logic unit 508 increments the counter 506 value by the number of flip-flop transitions. For example, if the update signal(s) indicate that one flip-flop transition has occurred then the counter update logic unit 508 increments the counter 506 by one; and if the update signal(s) indicate that two flip-flop transitions have occurred then the counter update logic unit 508 increments the counter 506 by two.

Where the counter update logic unit 508 receives an update signal for each monitored flip-flop then the counter update logic unit 508 may be configured to identify the number of flip-flop transitions that have occurred by counting the number of update signals that indicate a flip-flop transition has occurred. Where, however, there is a single update signal which comprises information that indicates the number of flip-flop transitions detected, the counter update logic unit 508 may be configured to identify the number of flip-flop transitions that have occurred from the information in the update signal itself.

The property verification logic unit 510 periodically assesses one or more properties to verify that the integrated circuit defined by the hardware design meets the specified power requirement. Each property defines an expression related to the counter that indicates whether the integrated circuit defined by the hardware design meets the specified power requirement. For example, if the power requirement is that the number of flip-flop transitions does not exceed 100 then the property may state or express that the counter is less than or equal to 100. As described above a property may be asserted or covered. If the property verification logic unit 510 determines that an asserted property is not true then the property verification logic unit 510 may output an error message. Conversely, if the property verification logic unit 510 determines that a covered property is true then the property verification logic unit 510 may output a message indicating the property is true.

Although, not shown in FIG. 5, it will be evident to a person of skill in the art that the logic units (e.g. flip-flop transition detection logic units 502, 504; counter update logic unit 508; and property verification logic unit 510) may be triggered by a clock. For example, one or more of the logic units may be triggered by the rising or positive edge of the clock. Furthermore, it will be evident to a person of skill in the art that one or more of the logic units (e.g. flip-flop transition detection logic units 502, 504; counter update logic unit 508; and property verification logic unit 510) may be combined or their functionality may divided between logic units in another manner.

Figure 6:
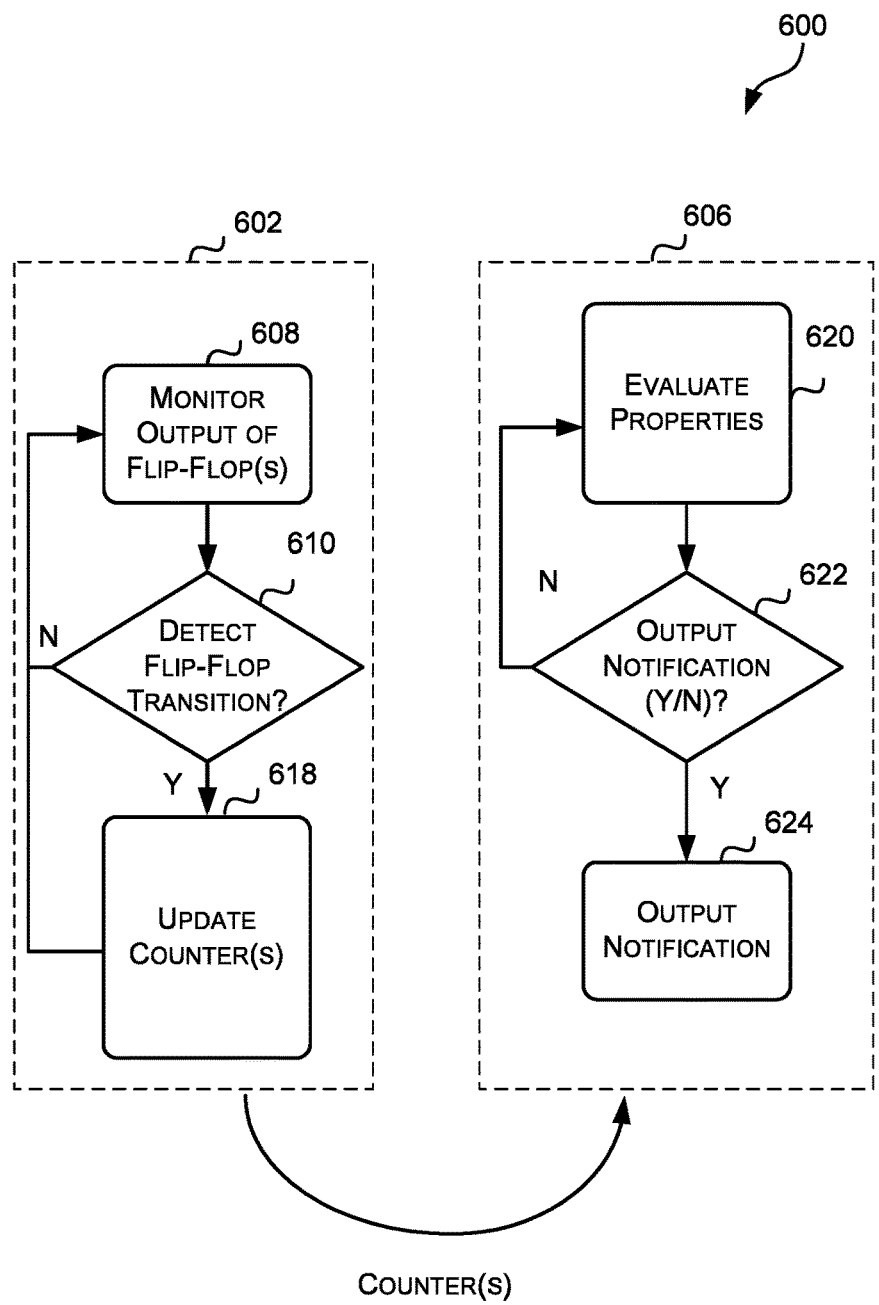
FIG. 6 is a flow diagram of an example method of determining whether an integrated circuit defined by a hardware design meets a power requirement using the hardware monitor of FIG. 5.

Reference is now made to FIG. 6 which illustrates an example method 600 for verifying that an integrated circuit defined by a hardware design meets a power requirement using the hardware monitor 500 of FIG. 5. The example method 600 comprises two processes 602 and 606 which may be executed in parallel. The first process 602 monitors the output signal of the relevant flip-flops of an instantiation of the hardware design and updates the counter when a transition on a monitored output signal is detected. The second process 606 periodically evaluates one or more properties that express the power requirement in terms of the counter value(s) to determine whether the power requirement is met.

In the first process 602, which may be executed by the flip-flop transition detection logic units 502, 504 and the counter update logic 508, the output signals of the relevant flip-flops of an instantiation of the hardware design are monitored at block 608. If a change in at least one of the monitored output signals is detected at block 610 then the counter (or counters) are updated at block 618 to indicate the number of flip-flop transitions detected. A change in a particular flip-flop output signal may be detected by comparing the current value of the output signal (e.g. the value of the output signal in the current clock cycle) to the previous value of the output signal (e.g. the value of the output signal in the previous clock cycle). As described above, the previous value of a particular flip-flop output signal may be obtained from a formal verification language system function, such as $past, or may be stored in a memory unit, such as a register. If no change is detected at block 610 the output signals of the relevant flip-flop(s) continue to be monitored at block 608.

In the second process 606, which may be executed by the property verification logic unit 510, blocks 620 to 624 are executed to evaluate the one or more properties to determine whether the integrated circuit described by the hardware design meets the power requirement. In particular, in block 620 one or more properties which express the power requirement in terms of the number of flip-flop transitions are evaluated. At block 622 it is determined whether a notification is to be output. For example, as described above, if the property verification logic unit 510 determines in block 620 that an asserted property is not true then the assertion is not valid and an error message may be output. If however, the property verification logic 510 determines in block 620 that a covered property is true then the cover is true and a notification message may be output. If no notification is to be output the method 606 proceeds back to block 620. Otherwise, the process 606 proceeds to block 624 where the appropriate notification is output. In some cases block 620 may be triggered upon detecting the rising edge of a main clock. However, in other cases the block 620 may be triggered by another event.

Figure 7:
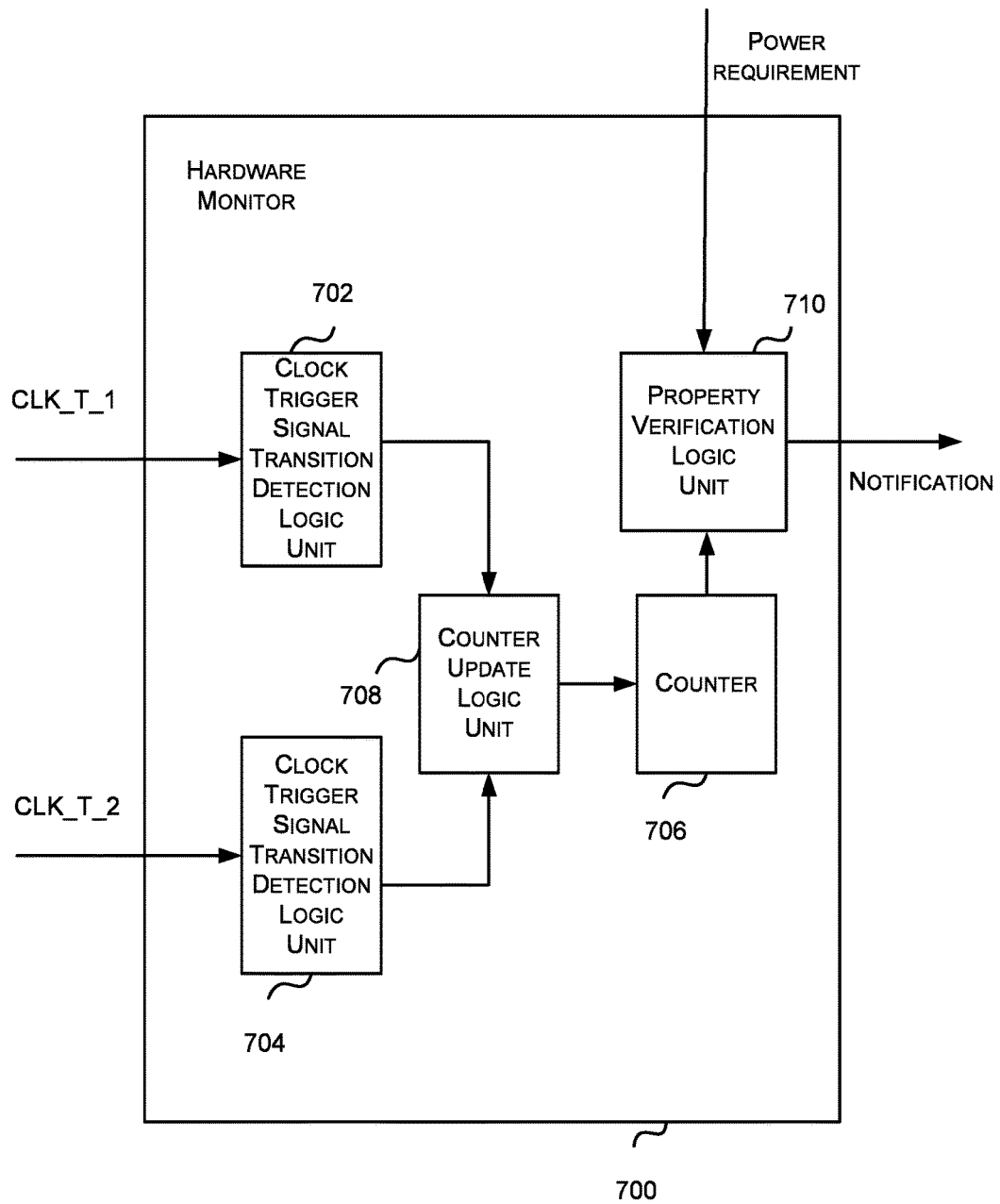
FIG. 7 is a block diagram of a second example implementation of the hardware monitor of FIG. 2.

Reference is now made to FIG. 7 which illustrates a second example implementation of a hardware monitor 700, which may be used as hardware monitor 208 of FIG. 2. In this example implementation the hardware monitor 700 counts the number of transitions of the clock trigger signal (e.g. CLK_T) of one or more flip-flops of an instantiation of a hardware design. In this example, the hardware monitor 700 is configured to count the number of transitions of the clock trigger signals of two flip-flops in an instantiation of a hardware design. However, in other examples, the hardware monitor 700 may be configured to count the clock trigger signal transitions for more or fewer flip-flops depending on, for example, the number of flip-flops in the instantiation of the hardware design, the power requirement 204 and scenario 206.

The hardware monitor 700 of FIG. 7 includes clock trigger signal transition detection logic units 702, 704 for detecting a transition in the clock trigger signal of a flip-flop, a counter 706 for storing a count of the number of clock trigger signal transitions, a counter update logic unit 708 for updating the counter 706 after a clock trigger signal transition detection logic unit 702, 704 detects a clock trigger signal transition, and a property verification logic unit 710 for evaluating one or more properties that define the power requirement in terms of the number of clock trigger signal transitions to verify the integrated circuit defined by the hardware design meets the power requirement.

Each clock trigger signal transition detection logic unit 702, 704 monitors the clock trigger signal (e.g. CLK_T) of a particular flip-flop to determine when there is a change in the clock trigger signal of that flip-flop. In other words, each clock trigger signal transition detection logic unit 702, 704 is configured to detect when there has been a clock trigger signal transition for a particular flip-flop.

Each clock trigger signal transition detection logic unit 702, 704 may determine that there has been a change in the clock trigger signal for a particular flip-flop by comparing the current value of the clock trigger signal (e.g. the value of the clock trigger signal in the current clock cycle) to the previous value of the clock trigger signal (e.g. the value of the clock trigger signal in the previous clock cycle). If the current value is different than the previous value then a change in the clock trigger signal has been detected. If, however, the current value is the same as the previous value then a change is not detected.

In some cases, the clock trigger signal transition detection logic units 702, 704 may be configured to use a formal verification language system function to obtain the previous value of the clock trigger signal (e.g. CLK_T). For example, as described above, SVA has the system function $past (x) which returns the value of an expression, x, in a previous clock cycle. In other cases, the clock trigger signal transition detection logic units 702, 704 may be configured to store the current value of the clock trigger signal (e.g. CLK_T) in a memory unit, such as a register, and then in the subsequent clock cycle the previous value of the clock trigger signal (e.g. CLK_T) can be obtained from the memory unit (e.g. register).

When a clock trigger signal transition detection logic unit 702 or 704 detects a clock trigger signal transition it notifies the counter update logic unit 708. For example, the clock trigger signal transition detection logic unit 702 or 704 may output an update signal that notifies the counter update logic unit 708 that a clock trigger signal transition has occurred.

Although FIG. 7 shows a separate clock trigger signal transition detection logic unit 702, 704 for each flip-flop that is being monitored, it will be evident to a person of skill in the art that there may be a single clock trigger signal transition detection logic unit that is configured to monitor multiple flip-flops for clock trigger signal transitions. In these cases the clock trigger signal transition detection logic unit may be configured to output the number of clock trigger signal transitions detected in each clock cycle as part of the update signal; or the clock trigger signal transition detection logic unit may be configured to output multiple update signals (e.g. one per monitored flip-flop).

The counter 706 is used to store a count of the number of clock trigger signal transitions of the monitored flip-flops that have been detected. As described above, the number of clock trigger signal transitions can be used as a representation of the clock power consumed by the relevant component or part of the integrated circuit defined by the hardware design. The counter 706 may be implemented using any suitable memory module, such as a register. The counter 706 is updated by the counter update logic unit 708.

Although FIG. 7 shows a single counter 706 for storing a total count of the clock trigger signal transitions for all monitored flip-flops, in other cases there may be a counter for each monitored flip-flop that is used to store the count or number of clock trigger signal transitions for that particular flip-flop. In these cases there may be a single counter update logic unit that is configured to update all counters, or there may be a counter update logic unit for each counter that is responsible for updating that counter.

The counter update logic unit 708 works in the same manner as the counter update logic unit 508 of FIG. 5 except instead of monitoring the notifications from the clock trigger signal transition detection logic units 702 and 704 to determine if they indicate a flip flop transition has occurred the counter update logic unit 708 of FIG. 7 monitors the notifications to determine if they indicate a clock trigger signal transition. Accordingly, the description of the counter update logic unit 508 given above with reference to FIG. 5 equally applies to the counter update logic unit 708 of FIG. 7.

The property verification logic unit 710, like the property verification logic unit 510 of FIG. 5, periodically assesses one or more properties to verify that the integrated circuit defined by the hardware design meets the specified power requirement. The one or more properties define evaluable expressions related to the number of clock trigger signal transitions that indicate whether the power requirement is met. For example, if the power requirement is that the number of clock trigger signal transitions does not exceed 100 then the property may state that the number of clock trigger signal transitions is less than or equal to 100.

Although, not shown in FIG. 7, it will be evident to a person of skill in the art that the logic units (e.g. clock trigger signal transition detection logic units 702, 704; counter update logic unit 708; and property verification logic unit 710) may be triggered by a clock. For example, one or more of the logic units may be triggered by the rising or positive edge of the clock. It will be also be evident to a person of skill in the art that the logic units may be combined into a single logic unit or their functionality may be divided between logic units in another manner.

Reference is now made to FIG. 8 which illustrates an example method 800 for verifying that an integrated circuit defined by the hardware design meets a power requirement using the hardware monitor 700 of FIG. 7. The example method 800 comprises two processes 802 and 806 which may be executed in parallel. The first process 802 monitors the clock trigger signals (e.g. CLK_T) of the relevant flip-flops and updates the counter(s) when a clock trigger signal transition has been detected. The second process 806 periodically evaluates one or more properties that define the power requirement in terms of the number of clock trigger signal transitions to verify that the power requirement is met.

In the first process 802, which may be executed by the clock trigger signal transition detection logic units 702, 704, and the counter update logic unit 708 the clock trigger signal input to the relevant flip-flop(s) are monitored at block 808. If a change in at least one of the monitored clock trigger signals is detected at block 810 then the counter(s) are updated at block 818. A change in a particular flip-flop clock trigger signal may be detected by comparing the current value of the clock trigger signal (e.g. the value of the clock trigger signal in the current clock cycle) to the previous value of the clock trigger signal (e.g. the value of the clock trigger signal in the previous clock cycle). As described above, the previous value of a particular flip-flop clock trigger signal may be obtained from a formal verification language system function, such as $past, or may be stored in a memory unit, such as a register. If no change is detected at block 810 the clock trigger signals of the relevant flip-flops continue to be monitored at block 808.

In the second process 806, which may be executed by the property verification logic unit 710, blocks 820 to 824 are executed to evaluate one or more properties to determine whether the integrated circuit described by the hardware design meets the power requirement. In particular, in block 820 one or more properties which define the power requirement in terms of the number of clock trigger signal transitions are evaluated. At block 822 it is determined whether a notification is to be output based on the evaluation in block 822. For example, if an asserted property is found to be false in block 820 then a notification may be output indicating the assertion is not valid. If, however, a covered property is found to be true in block 820 then a notification may be output indicating the cover has been met. If no notifications are to be output the process 806 proceeds back to block 820. Otherwise, the process 806 proceeds to block 824 where the appropriate notification is output. In some cases block 820 may be triggered upon detecting the rising edge of a main clock. However, in other cases the block 820 may be triggered by another event.

Figure 9:
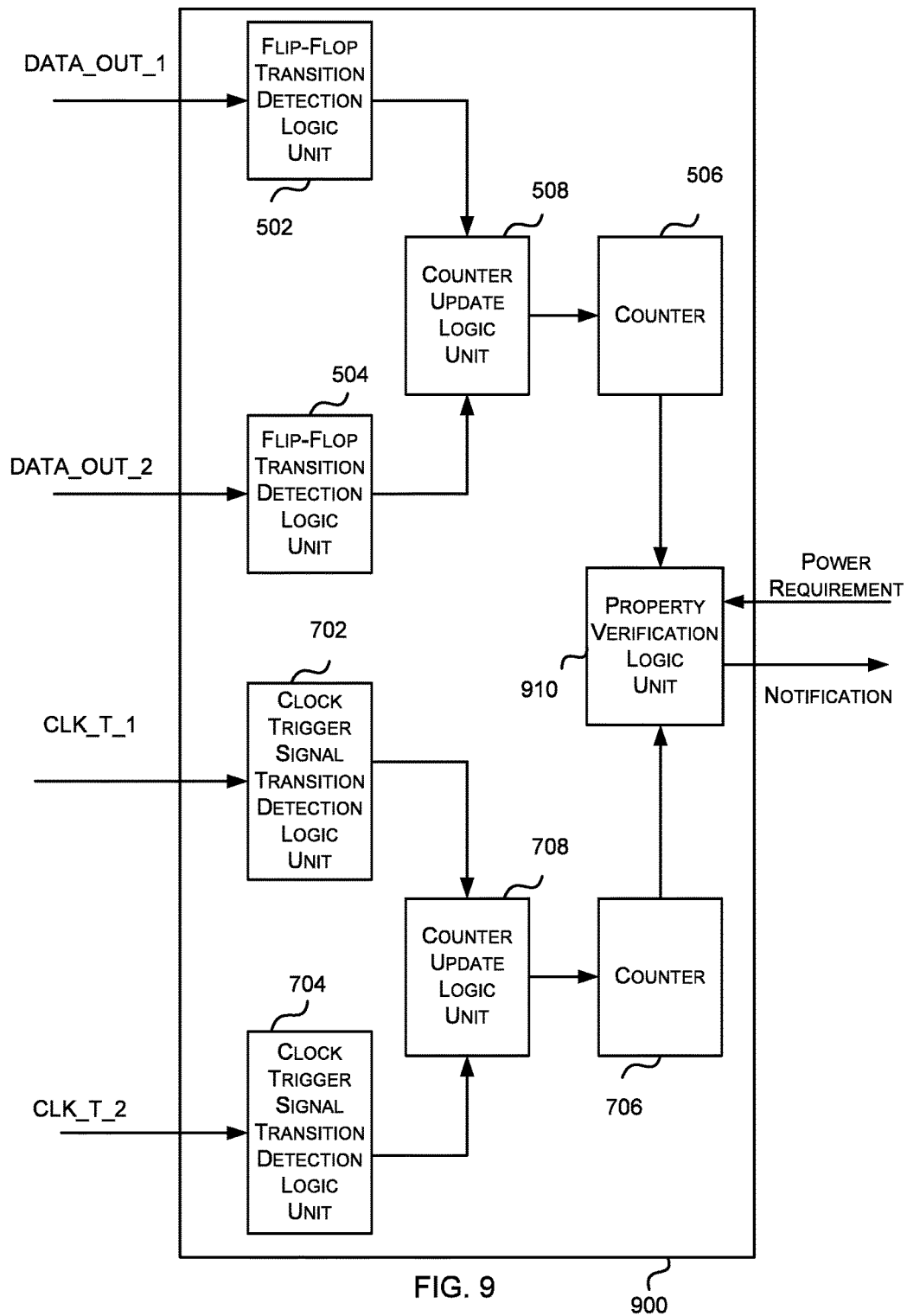
FIG. 9 is a block diagram of a third example implementation of the hardware monitor of FIG. 2.

Reference is now made to FIG. 9 which illustrates a third example implementation of a hardware monitor 900, which may be used as hardware monitor 208 of FIG. 2. In this example implementation the hardware monitor 900 is configured to count two types of power consuming transitions. In particular, the hardware monitor 900 is configured to count both the number of clock transitions (i.e. clock trigger signal transitions) and the number of flip-flop transitions (i.e. output signal transitions). In the example shown in FIG. 9, the hardware monitor 900 is configured to count the number of clock transitions and flip-flop transitions for two flip-flops in an instantiation of a hardware design. However, in other examples, the hardware monitor 900 may be configured to count the number of flip-flop and clock transitions for more or fewer flip-flops in an instantiation of a hardware design based on, for example, the number of flip-flops in the instantiation of hardware design, the power requirement 204 and/or the scenario 206.

The hardware monitor 900 of FIG. 9 includes flip-flop transition detection logic units 502, 504 for detecting a flip-flop transition, a counter 506 for storing a count of the number of flip-flop transitions, and a counter update logic unit 508 for updating the counter 506 after a flip-flop transition detection logic unit 502, 504 detects a flip-flop transition. The flip-flop transition detection logic units 502, 504, counter 506 and counter update logic unit 508 may operate and may be configured as described above with reference to FIG. 5 to count the number of flip-flop transitions for the one or more flip-flops.

The hardware monitor 900 of FIG. 9 includes clock trigger signal transition detection logic units 702, 704 for detecting a clock trigger signal transition, a counter 706 for storing a count of the number of clock trigger signal transitions, and a counter update logic unit 708 for updating the counter 706 after a clock trigger signal transition detection logic unit 702, 704 detects an clock trigger signal transition. The clock trigger signal transition detection logic units 702, 704, counter 706 and counter update logic unit 708 may operate and may be configured as described above with reference to FIG. 7 to count the number of clock trigger signal transitions for the one or more flip-flops.

The hardware monitor 900 of FIG. 9 also includes a property verification logic unit 910 which is configured to periodically evaluate one or more properties to verify that the integrated circuit defined by the hardware design meets the specified power requirement. The one or more properties express the power requirement in terms of the number of flip-flop transitions and/or clock trigger signal transitions. For example, if the power requirement is that the total number of flip-flop transitions and clock trigger signals does not exceed 100 then a property may state that the sum of the two counters 506 and 706 is less than or equal to 100. The property verification logic unit 910 may output a notification based on whether or not the property is true and whether the property is asserted or covered. For example, if the property verification logic unit 910 determines that an asserted property is false then the property verification logic unit 910 may be configured to output a notification indicating the assertion failed. If, however, the property verification logic unit 910 determines that a covered property is true then the property verification logic unit 910 may be configured to output a notification that the cover is true.

The hardware monitor 900 of FIG. 9 may be configured to identify flip-flops where the number of clock transitions (i.e. clock trigger signal transitions) is greater than the number of flip-flop transitions (i.e. output signal transitions) to identify any flip-flops that are consuming too much power. For example, a cover property may be defined for each relevant flip-flop that the number of clock trigger signal trigger signal transitions is greater than the number of flip-flop transitions. The hardware monitor 900 will then output a notification for any flip-flop for which this is true at least once. The hardware design may then be modified to add clock gating and/or flip-flop enables to reduce the number of clock trigger signal transitions to be closer to the number of flip-flop transitions. As described below in reference to FIGS. 10 and 11 the total number of power consuming transitions for an instantiation of the modified hardware design can then be compared to the total number of power consuming transitions for an instantiation of the original hardware design to verify that the integrated circuit described by the modified hardware design does in fact consume less power than the integrated circuit described by the original hardware design.

Although, not shown in FIG. 9, it will be evident to a person of skill in the art that the logic units (e.g. flip-flop transition detection logic units 502, 504; counter update logic unit 508; clock trigger signal transition detection logic units 702, 704; counter update logic unit 708; and property verification logic unit 910) may be triggered by a clock. For example, one or more of the logic units may be triggered by the rising or positive edge of the clock.

The system 200 of FIG. 2 can be used to verify different types of power requirements. For example, the system 200 of FIG. 2 may be used to verify that the power consumption of an integrated circuit defined by a hardware design remains within expected bounds. In these cases the property used by the hardware monitor 208 may compare the count of power consuming transitions (or a power equivalent thereof (e.g. where the count is converted to Watts) to a fixed value. For example, the property may state or assert that the count of power consuming transitions is less than or equal to the fixed value (e.g. count<=100).

Figure 10:
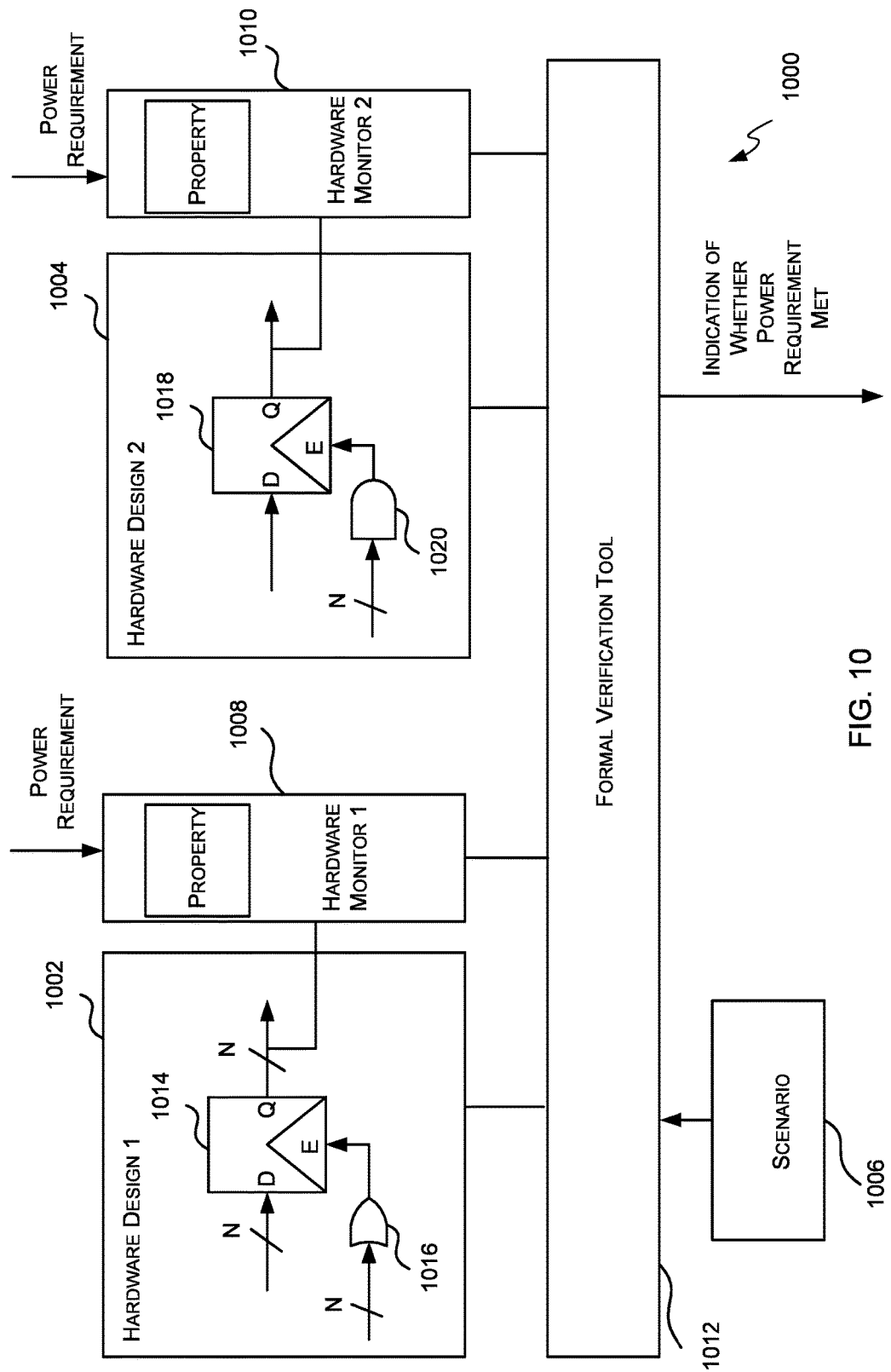
FIG. 10 is a block diagram of a first example system for comparing the power consumption of integrated circuits defined by different hardware designs.
Figure 11:
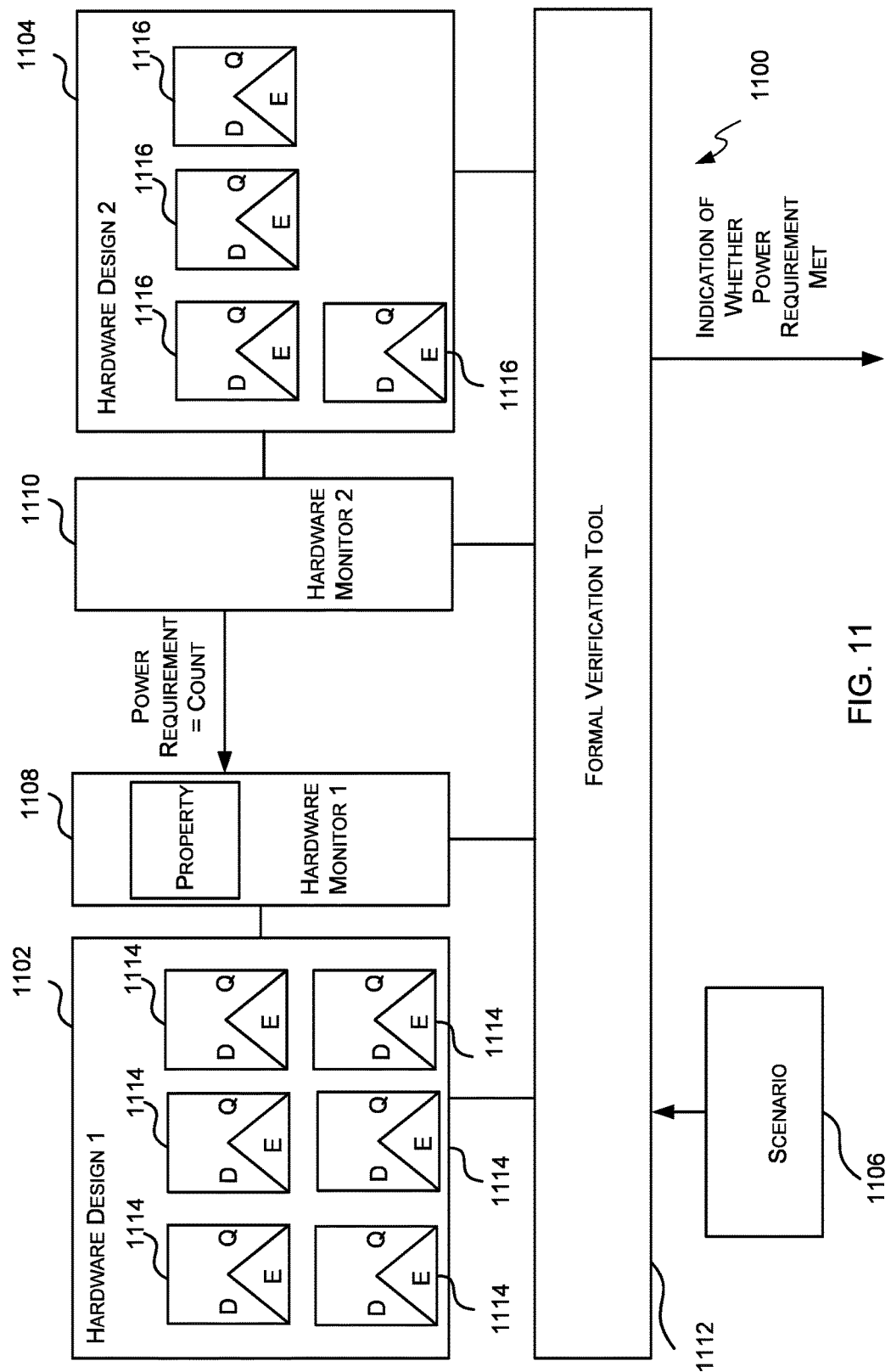
FIG. 11 is a block diagram of a second example system for comparing the power consumption of integrated circuits defined by different hardware designs.

The system 200 of FIG. 2 may also be used to compare the power consumption of an integrated circuit defined by a first hardware design to the power consumption of an integrated circuit defined by a second hardware design (e.g. a previous iteration of the first hardware design). FIGS. 10 and 11 illustrate two example ways in which the system of FIG. 2 may be used to compare the power consumption of two integrated circuits defined by two different hardware designs.

Reference is now made to FIG. 10 which illustrates a block diagram of a first example system 1000 for comparing the power consumption of an integrated circuit defined by a first hardware design 1002 to the power consumption of an integrated circuit defined by a second hardware design 1004. The system 1000 of FIG. 10 is configured to determine whether the integrated circuit defined by each hardware design 1002 and 1004 meets a power requirement for a defined scenario 1006.

In particular, the system 1000 of FIG. 10 comprises a hardware monitor 1008 and 1010 (such as hardware monitor 208 described above) for each hardware design 1002 and 1004 that is configured to count the number of power consuming transitions of the relevant flip-flops for that hardware design 1002 or 1004, and evaluate one or more properties based on the count to verify that the power requirement is met. For example, the property in each hardware monitor 1002 and 1004 may state that the count of power consuming transitions is less than a fixed value (e.g. 100) defined by the power requirement.

A formal verification tool 1012 then uses the hardware monitors 1002 and 1004 and the properties defined therein to determine, for the defined scenario 1006, whether the power requirement is met for the integrated circuits defined by the two hardware designs 1002 and 1004. Failure of the integrated circuit defined by one of the hardware designs and not the other integrated circuit to meet the power requirement may indicate that one hardware design will produce an integrated circuit that has better power consumption (i.e. consumes less power) than the other.

In some cases the first and second hardware designs may represent an optimized and un-optimized version of the same hardware design respectively. For example, in FIG. 10, the first or un-optimized hardware design 1002 may defined a set of control flip-flops 1014 being driven by a number of inputs controlled by an OR gate 1016; and the second or optimized hardware design 1004 may define only a single flip-flop 1018 that is controlled through an AND gate 1020.

Reference is now made to FIG. 11 which illustrates a block diagram of a second example system 1100 for comparing the power consumption of an integrated circuit defined by a first hardware design 1102 to the power consumption of an integrated circuit defined by a second hardware design 1104. The system 1100 of FIG. 11 is configured to verify that the power consumption of one integrated circuit is less than the other integrated circuit for a defined scenario 1106.

In particular, the system 1100 of FIG. 11 comprises a hardware monitor 1108 and 1110 (such as hardware monitor 208 described above) for each hardware design 1102 and 1104. Each hardware monitor 1108 and 1110 is configured to count the number of power consuming transitions of the relevant flip-flops for an instantiations of the associated hardware design 1102 or 1104. The second hardware monitor 1110 then provides the count to the first hardware monitor 1108 and the first hardware monitor 1108 evaluates a property that compares the two counts. For example, a property in the first hardware monitor 1108 may state that the count of power consuming transitions for the instantiation of the first hardware design 1102 is less than the count of the power consuming transitions for the instantiation of the second hardware design 1104. There may also be a second property that states that the count of the power consuming transitions for the instantiation of the second hardware design 1104 is greater than or equal to the count of the power consuming transitions for the instantiation of the first hardware design 1102.

A formal verification tool 1112 then uses the hardware monitors 1108 and 1110 and the properties defined therein to determine, for the defined scenario 1106, whether the power requirement is met. If the properties are asserted then the formal verification tool 1112 can exhaustively prove that the integrated circuit defined by the first hardware design 1102 will always consumes less power than the integrated circuit defined by the second hardware design 1104 for the defined scenario 1106.

In some cases the first and second hardware designs 1102 and 1104 may represent an optimized and un-optimized version of the same hardware design respectively. For example, in FIG. 11, the first or un-optimized hardware design 1102 defines a set of control flip-flops 1114; and the second or optimized hardware design 1104 defines fewer flip-flops 1116.

The concepts described above in the context of verifying an integrated circuit defined by a hardware design meets a power requirements, can be used to verify that an integrated circuit defined by a hardware design has a particular operating characteristic that meets an operating requirements. In particular, there may be provided a hardware monitor for use by a formal verification tool to verify that an integrated circuit defined by a hardware design has an operating characteristic which meets an operating requirement, the hardware monitor comprising: one or more event detection logic units, the one or more event detection logic units configured to detect an occurrence of an event which is indicative of the operating characteristic in an instantiation of the hardware design; and a property verification logic unit configured to determine whether the operating requirement is met at a particular point in time by evaluating one or more properties based on whether the one or more event detection logic units have detected the occurrence of an event which is indicative of the operating characteristic in the instantiation of the hardware design.

Figure 12:
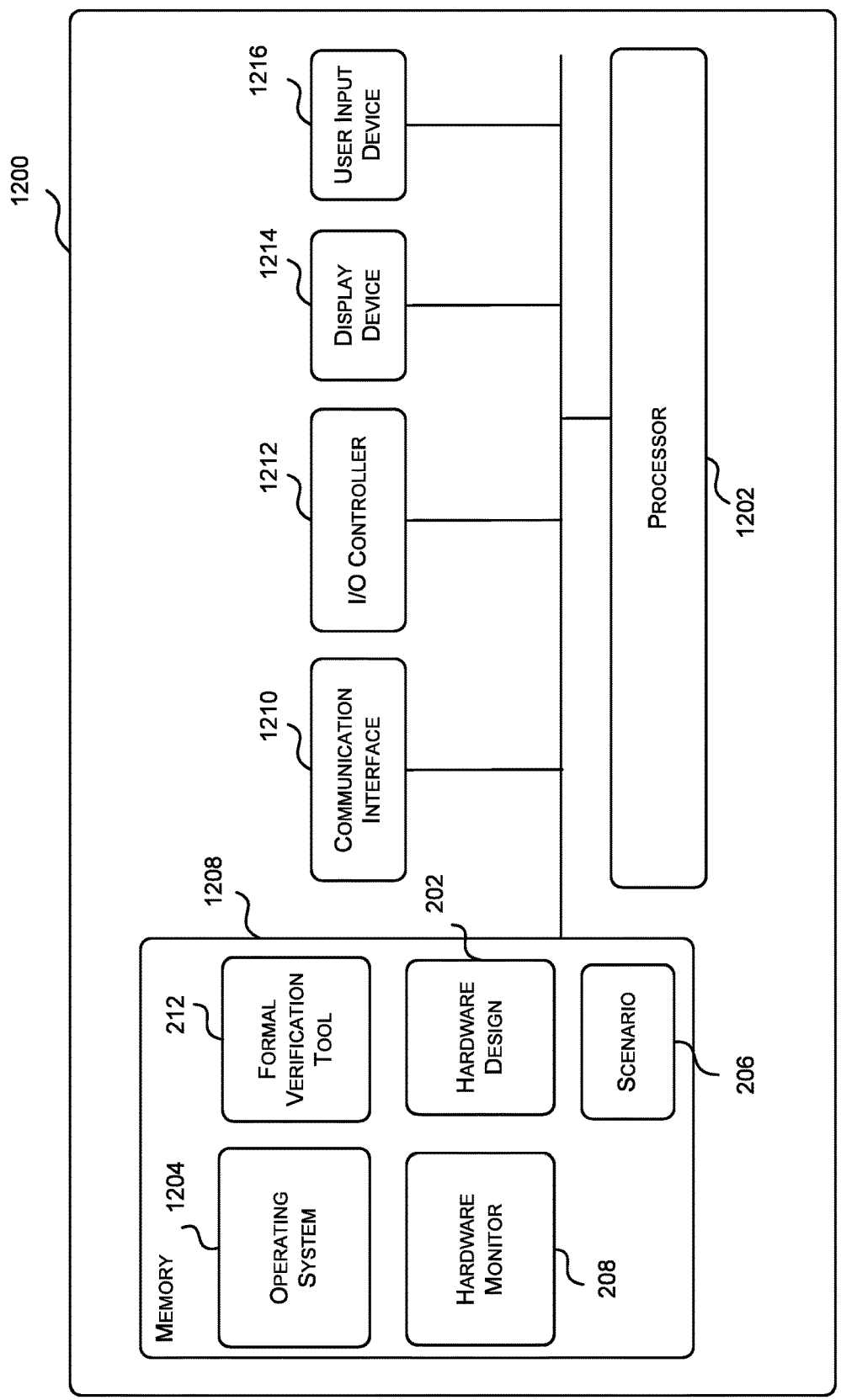
FIG. 12 is a block diagram of an example computing-based device.

FIG. 12 illustrates various components of an exemplary computing-based device 1200 which may be implemented as any form of a computing and/or electronic device, and in which embodiments of the systems, hardware monitors and methods described herein may be implemented.

Computing-based device 1200 comprises one or more processors 1202 which may be microprocessors, controllers or any other suitable type of processors for processing computer executable instructions to control the operation of the device in order to verify that an integrated circuit defined by a hardware design meets a power requirement. In some examples, for example where a system on a chip architecture is used, the processors 1202 may include one or more fixed function blocks (also referred to as accelerators) which implement a part of the method in hardware (rather than software or firmware). Platform software comprising an operating system 1204 or any other suitable platform software may be provided at the computing-based device to enable application software (e.g. a formal verification tool 212) to be executed on the device.

The computer executable instructions may be provided using any computer-readable media that is accessible by computing-based device 1200. Computer-readable media may include, for example, computer storage media such as memory 1208 and communications media. Computer storage media (i.e. non-transitory machine readable media), such as memory 1208, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1208) is shown within the computing-based device 1200 it will be appreciated that the storage may be distributed or located remotely and accessed via a network or other communication link (e.g. using communication interface 1210).

The computing-based device 1200 also comprises an input/output controller 1212 arranged to output display information to a display device 1214 which may be separate from or integral to the computing-based device 1200. The display information may provide a graphical user interface. The input/output controller 1212 is also arranged to receive and process input from one or more devices, such as a user input device 1216 (e.g. a mouse or a keyboard). This user input may be used to create the hardware monitor 208, scenario 206 and/or hardware design 202. In an embodiment the display device 1214 may also act as the user input device 1216 if it is a touch sensitive display device. The input/output controller 1212 may also output data to devices other than the display device, e.g. a locally connected printing device (not shown in FIG. 12).

Figure 13:
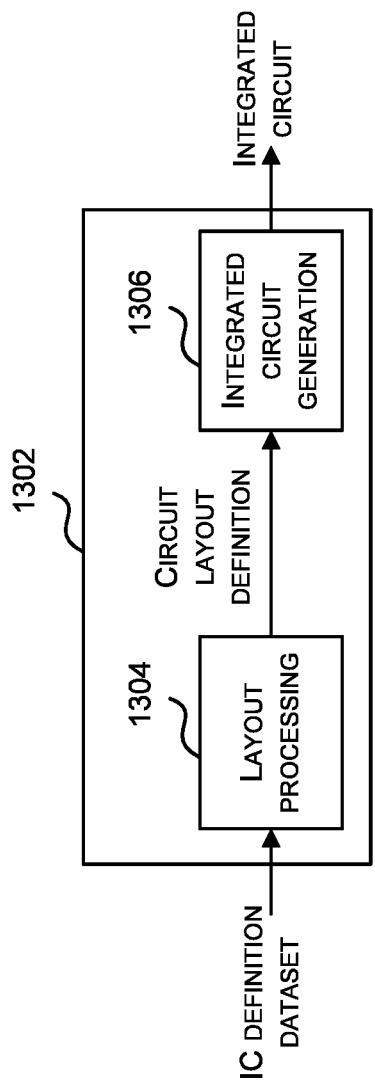
FIG. 13 is a block diagram of an example integrated circuit manufacturing system.

FIG. 13 shows an example of an integrated circuit (IC) manufacturing system 1302 which comprises a layout processing system 1304 and an integrated circuit generation system 1306. The IC manufacturing system 1302 is configured to receive an IC definition dataset (e.g. a hardware design as described in any of the examples herein), process the IC definition dataset, and generate an IC according to the IC definition dataset. The processing of the IC definition dataset configures the IC manufacturing system 1302 to manufacture an integrated circuit. More specifically, the layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC. The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A system to verify that an integrated circuit defined by a hardware design meets a power requirement, the system comprising:
   a hardware monitor including
      one or more transition detection logic units, the one or more transition detection logic units configured to detect whether a power consuming transition has occurred with one or more flip-flops of an instantiation of the hardware design,
      one or more counter update logic units in communication with the one or more transition detection logic units, the one or more counter update logic units configured to count a number of power consuming transitions detected by the one or more transition detection logic units, and
      a property verification logic unit configured to determine whether the power requirement is met at a particular point in time by evaluating one or more properties related to power consuming transitions based on the number of power consuming transitions counted by the one or more counter update logic units;
   a scenario defined in a formal verification language; and
   a formal verification tool configured to formally verify whether the integrated circuit defined by the hardware design meets the power requirement for the scenario using the hardware monitor;
   wherein the hardware design, when processed in an integrated circuit manufacturing system, configures the integrated circuit manufacturing system to manufacture the integrated circuit.

2. The system of claim 1, wherein at least one of the one or more transition detection logic units is configured to detect a flip-flop transition of a flip-flop of the instantiation of the hardware design.

3. The system of claim 2, wherein the at least one of the one or more transition detection logic units is configured to detect a flip-flop transition of a flip-flop of the instantiation of the hardware design by monitoring an output signal of the flip-flop to detect a change in the output signal.

4. The system of claim 3, wherein the at least one of the one or more transition detection logic units is configured to detect a change in the output signal by comparing a present value of the output signal to a previous value of the output signal.

5. The system of claim 1, wherein at least one of the one or more transition detection logic units is configured to detect a clock transition of a flip-flop of the instantiation of the hardware design.

6. The system of claim 5, wherein the at least one of the one or more transition detection logic units is configured to detect a clock transition of a flip-flop of the instantiation of the hardware design by monitoring a clock trigger signal of the flip-flop and detecting a change in the clock trigger signal.

7. The system of claim 6, wherein the at least one of the one or more transition detection logic units is configured to detect a change in the clock trigger signal by comparing a present value of the clock trigger signal to a previous value of the clock trigger signal.

8. The system of claim 1, wherein the one or more properties comprises a property that compares the count of the power consuming transitions to a maximum number of power consuming transitions defined by the power requirement.

9. The system of claim 8, wherein the one or more properties comprises a property that states that the count of power consuming transitions is less than or equal to the maximum number of power consuming transitions.

10. The system of claim 1, wherein the one or more properties comprises a property that compares the count of power consuming transitions to a count of power consuming transitions for another hardware design.

11. The system of claim 10, wherein the one or more properties comprises a property that asserts that the count of power consuming transitions is less than or equal to the count of power consuming transitions for the other hardware design.

12. A method of verifying that an integrated circuit defined by a hardware design meets a power requirement, the method comprising:
   detecting, by a hardware monitor, whether a power consuming transition has occurred for one or more flip-flops of an instantiation of the hardware design;
   in response to detecting that a power consuming transition has occurred, updating, by the hardware monitor, a count of power consuming transitions for the instantiation of the hardware design;
   determining, whether the power requirement is met at a particular point in time by evaluating one or more properties related to power consuming transitions based on the count of power consuming transitions for the instantiation of the hardware design; and
   formally verifying the one or more properties for a predefined scenario using a formal verification tool;
   wherein the hardware design, when processed in an integrated circuit manufacturing system, configures the integrated circuit manufacturing system to manufacture the integrated circuit.

13. The method of claim 12, wherein the one or more properties comprises a property that compares the count of power consuming transitions to a maximum number of power consuming transitions defined by the power requirement.

14. The method of claim 12, wherein the one or more properties comprises a property that the compares the count of power consuming transitions for the hardware design to a count of power consuming transitions for another hardware design.

15. A non-transitory computer readable storage medium having stored thereon computer readable instructions, that when executed at a computer system, cause the computer system to perform the steps of the method as set forth in claim 12.

16. A system to verify that an integrated circuit defined by a hardware design has an operating characteristic which meets an operating requirement, the system comprising:
   a hardware monitor including
      one or more event detection logic units, the one or more event detection logic units configured to detect an occurrence of an event which is indicative of the operating characteristic in an instantiation of the hardware design, and
      a property verification logic unit configured to determine whether the operating requirement is met at a particular point in time by evaluating one or more properties related to an operating characteristic based on whether the one or more event detection logic units have detected the occurrence of an event which is indicative of the operating characteristic in the instantiation of the hardware design;
   a scenario defined in a formal verification language; and
   a formal verification tool configured to formally verify whether the integrated circuit defined by the hardware design meets the operating requirement for the scenario using the hardware monitor;
   wherein the hardware design, when processed in an integrated circuit manufacturing system, configures the integrated circuit manufacturing system to manufacture the integrated circuit.

* * * * *